2,954,386
16-METHYL-17-LOWER ACYLOXY-21-FLUORO-STEROID-3,20-DIONES

Roger E. Beyler, Westfield, N.J., assignor to Merck & Co., Inc., Rahway, N.J., a corporation of New Jersey No Drawing. Filed Aug. 22, 1958, Ser. No. 756,530

6 Claims. (Cl. 260—397.47)

This invention is concerned generally with novel steroid compounds and processes of preparing the same. More particularly, it relates to 16-methyl-17α-acyloxy-21-fluoro-4 - pregnene - 3,20 - diones, to processes for preparing these compounds and to pharmaceutical compositions containing them. These novel 16-methyl-17α-acyloxy-21-fluoro-4-pregnene-3,20-diones possess extremely high progestational activity and are valuable as oral and parenteral progestational agents. They find application, in connection with estrogenic hormones, in the re-establishment of normal endometrium-ovary-anterior pituitary relationships in cases of menstrual disturbances.

These novel 16-methyl-17α-acyloxy - 21 - fluoro-4-pregnene-3,20-diones, subject of the present invention, may be chemically represented as follows:

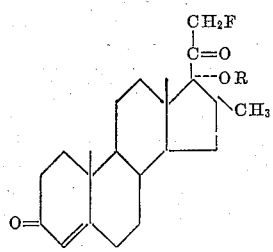

wherein R stands for acyl.

These new 16-methyl-17α-acyloxy-21-fluoro-4-pregnene-3,20-diones may be prepared by reacting the corresponding 17α,21-diol-compound with methane sulfonyl halide thereby forming the 21-methane sulfonate of 16-methyl-4-pregnene-17α,21-diol-3,20-dione; the latter compound is reacted with an alkali metal fluoride to form 16-methyl-21-fluoro-4-pregnene-17α-ol 3,20-dione, which is reacted with an acyl anhydride to produce 16-methyl-17α-acyloxy-21-fluoro-4-pregnene-3,20-dione.

In carrying out the above-described process, a methane sulfonyl halide, such as methane sulfonyl chloride, is reacted with 16-methyl-4-pregnene-17α,21-diol-3,20-dione, more particularly the 16α-methyl-4-pregnene-17α,21-diol-3,20-dione, 16β-methyl-4-pregnene-17α,21-diol-3,20-dione, as well as mixtures thereof. The reaction is conveniently conducted by bringing the reactants together in a solution in a tertiary amine such as pyridine, collidine, and the like, and preferably at a temperature of about 0–5° C., under which conditions the reaction is ordinarily complete in approximately 1 hour. The reaction mixture is diluted with water, and the material which precipitates is recovered and dried to give the corresponding 16-methyl-4-pregnene-17α,21-diol-3,20-dione 21-methane sulfonate, for example 16α-methyl-4-pregnene - 17α,21-diol-3,20-dione 21-methane sulfonate, 16β-methyl-4-pregnene-17α,-21-diol-3,20-dione 21-methane sulfonate, and mixtures thereof.

The reaction between the alkali metal fluoride, such as potassium fluoride, and the 16-methyl-4-pregnene-17α,21-diol-3,20-dione 21-methane sulfonate is conveniently conducted by bringing the reactants together in anhydrous dimethylformamide and heating the resulting solution, preferably at 110° C., under which conditions the reaction is ordinarily complete in about 20 hours. The reaction mixture is cooled, diluted with water, and the aqueous mixture is extracted with a water-immiscible organic solvent such as chloroform. The organic solvent solution is dried, evaporated to dryness, and the residual material is chromatographed on acid washed alumina to give 16-methyl-21-fluoro-4-pregnene-17α-ol-3,20 - dione, more particularly, 16α-methyl-21-fluoro-4-pregnene-17α-ol-3,20-dione, 16β-methyl-21-fluoro-4-pregnene - 17α-ol-3,20-dione, and mixtures thereof. The reaction between the 16-methyl-21-fluoro-4-pregnene-17α-ol-3,20-dione and the acyl anhydride, for example a lower alkanoic anhydride such as acetic anhydride, propionic anhydride, butyric anhydride, other lower hydrocarbon carboxylic acyl anhydrides, such as benzoic anhydride, and the like, is conveniently carried out by heating the reactants together at a temperature in excess of about 100° C., preferably at reflux temperature, under which conditions the acylation reaction is ordinarily complete in about 10–12 hours. If desired, the reaction between the acyl anhydride and the 16-methyl-21-fluoro-4-pregnene-17α-ol-3,20-dione can be conducted in the presence of a mineral acid catalyst, a sulfonic acid catalyst such as p-toluene sulfonic acid, and the like, under which conditions the reaction can be effected by maintaining the reaction mixture at room temperature for a period of about 16–96 hours. The 17α-acyloxy derivative obtained in accordance with the above-described procedures is conveniently recovered by diluting the reaction mixture with water, extracting the resulting aqueous mixture with a water-immiscible organic liquid such as chloroform, drying the organic solvent extract, and evaporating the organic solvent solution to dryness. The residual material is purified by chromatography on acid-washed alumina, or by recrystallization from an organic solvent such as ethyl acetate, to give 16-methyl-21-fluoro-17α-acyloxy-4-pregnene-3,20 - dione, more particularly, 16-methyl-21-fluoro-17-(lower hydrocarbon carboxylic acyloxy)-4-pregnene-3,20-dione as for example 16α-methyl-21-fluoro-17α-benzoxy-4-pregnene-3,20-dione, 16β-methyl-21-fluoro-17α-benzoxy-4-pregnene-3,20 - dione, 16 - methyl-21-fluoro-17alkanoyloxy-4-pregnene-3,20-dione such as 16α-methyl-21-fluoro-17α-acetoxyy-4-pregnene-3,20-dione, 16β - methyl-21-fluoro-17α-acetoxy-4-pregnene-2,20-dione, 16α-methyl-21-fluoro-17α-propionoxy-4-pregnene-3,20-dione, 16β-methyl-21-fluoro-17α-priopionoxy-4-pregnene-3,20-dione, 16α - methyl-21-fluoro-17α-butyroxy-4-pregnene-3,20-dione, 16β - methyl-21-fluoro-17α-butyroxy-4-pregnene-3,20-dione, and the like.

The following examples illustrate methods of carrying out the present invention but it is to be understood that these examples are given for purposes of illustration and not of limitation.

Example 1

To a solution of 85 mgs. of 16α-methyl-4-pregnene-17α,21-diol-3,20-dione in 0.5 ml. of pyridine cooled to 0° C., is added 0.03 ml. of methane sulfonyl chloride. The resulting mixture is allowed to stand at a temperature of approximately 0° C. for a period of about 1 hour. Water is then added to the reaction mixture, and the material which precipitates is recovered, washed with water, and dried to give 16α-methyl-4-pregnene-17α,21-diol-3,20-dione 21-methane sulfonate.

To a solution of 62 mg. of 16α-methyl-4-pregnene-17α,21-diol-3,20-dione 21-methane sulfonate in 1 ml. of anhydrous dimethylformamide is added sufficient anhydrous potassium fluoride to give a saturated solution. The mixture is heated at a temperature of about 110° C.

for approximately 20 hours. The reaction mixture is cooled, water is added thereto, and the aqueous mixture is extracted with chloroform. The chloroform extract is dried over anhydrous sodium sulfate, evaporated to dryness, and the residual material is chromatographed on acid washed alumina. The alumina column is eluted first with a 1:1 mixture of ether-chloroform and then with chloroform. The chloroform eluate is evaporated and the residual material is recrystallized to give 16α-methyl-21-fluoro-4-pregnene-17α-ol-3,20-dione.

A solution of 30 mg. of 16α-methyl-21-fluoro-4-pregnene-17α-ol-3,20-dione in 1.4 cc. of redistilled acetic anhydride is heated under reflux for a period of about 12 hours. The solvent is evaporated from the reaction mixture in vacuo, the residual material is triturated with warm water, and the water-insoluble material is recrystallized from methanol to give 16α-methyl-21-fluoro-17α-acetoxy-4-pregnene-3,20-dione.

In similar fashion, the 16α-methyl-21-fluoro-4-pregnene-17α-ol-3,20-dione is reacted with propionic anhydride to give 16α-methyl-21-fluoro-17α-propionoxy-4-pregnene-3,20-dione, and with butyric anhydride to give 16α-methyl-21-fluoro-17α-butyroxy-4-pregnene-3,20-dione.

*Example 2*

To a solution of 85 mgs. of 16β-methyl-4-pregnene-17α,21-diol-3,20-dione in 0.5 ml. of pyridine, cooled to 0° C., is added 0.03 ml. of methane sulfonyl chloride. The resulting mixture is allowed to stand at a temperature of approximately 0° C. for a period of about 1 hour. Water is then added to the reaction mixture, and the material which precipitates is recovered, washed with water, and dried to give 16β-methyl-4-pregnene-17α,21-diol-3,20-dione 21-methane sulfonate.

To a solution of 62 mg. of 16β-methyl-4-pregnene-17α,21-diol-3,20-dione 21-methane sulfonate in 1 ml. of anhydrous dimethylformamide is added sufficient anhydrous potassium fluoride to give a saturated solution. The mixture is heated at a temperature of about 110° C. for approximately 20 hours. The reaction mixture is cooled, water is added thereto, and the aqueous mixture is extracted with chloroform. The chloroform extract is dried over anhydrous sodium sulfate, evaporated to dryness, and the residual material is chromatographed on acid washed alumina. The alumina column is eluated first with a 1:1 mixture of ether-chloroform and then with chloroform. The chloroform eluate is evaporated and the residual material is recrystallized to give 16β-methyl-21-fluoro-4-pregnene-17α-ol-3,20-dione.

A solution of 30 mg. of 16β-methyl-21-fluoro-4-pregnene-17α-ol-3,20-dione in 1.4 cc. of redistilled acetic anhydride is heated under reflux for a period of about 12 hours. The solvent is evaporated from the reaction mixture in vacuo, the residual material is triturated with warm water, and the water-insoluble material is recrystallized from methanol to give 16β-methyl-21-fluoro-17α-acetoxy-4-pregnene-3,20-dione.

In similar fashion, the 16β-methyl-21-fluoro-4-pregnene - 17α - ol - 3,20-dione is reacted with propionic anhydride to give 16β-methyl-21-fluoro-17α-propionoxy-4-pregnene-3,20-dione and with butyric anhydride to give 16β - methyl - 21 - fluoro - 17α - butyroxy - 4 - pregnene-3,20-dione.

The 16-methyl-4-pregnene-17α,21-diol-3,20-dione compounds used as starting materials in the foregoing examples are prepared, starting with the known 16-pregnene-3α-ol-20-one 3-acetate, in accordance with the following procedures:

A solution of 10.22 g. of methyl iodide in 50 ml. of ether is added to 1.73 g. of magnesium in 50 ml. of ether. To the resulting ethereal solution of methyl magnesium iodide, maintained under a nitrogen atmosphere, is added 0.045 g. of anhydrous cuprous chloride. To this mixture is added, over a period of about one hour during which period the reaction mixture is stirred vigorously and maintained at approximately room temperature, a solution of about 5.6 g. of 16-pregnene-3α-ol-20-one 3-acetate in 175 ml. of ether. A white granular solid separates during this addition. The resulting mixture is heated under gentle reflux for two hours after which the reaction mixture is cooled, and 125 ml. of saturated, aqueous ammonium chloride solution is added followed by 200 ml. of ether. The layers are separated, and the ethereal layer is washed with three 50 ml. portions of water. The washed ethereal layer is dried, and the solvent evaporated in vacuo to give a brown viscous oil. The latter material is heated for 15 minutes at 60–70° C. with a mixture of 25 ml. acetic anhydride and 25 ml. pyridine and the acetylated product is purified by chromatography on acid-washed alumina followed by crystallization from petroleum ether to give approximately 1.5 g. of substantially pure 16α-methyl-pregnane-3α-ol-20-one 3-acetate A solution of 22 g. of 16α-methyl-pregnane-3α-ol-20-one 3-acetate and 1 g. of p-toluene-sulfonic acid in 250 ml. of acetic anhydride is heated at reflux under nitrogen for a period of approximately 3 days. Two grams of potassium acetate (anhydrous) is added, and the volatile solvents are separated by distillation in vacuo. The residual material is extracted with benzene, and the benzene extract is filtered to remove insoluble material. The benzene extracts are evaporated to a volume of 100 ml. and petroleum ether is added to the cloud point. The resulting solution is adsorbed on 660 g. of acid-washed alumina; the alumina adsorbate is then washed with 2 liters of petroleum ether. The adsorbate is then eluted with 85:15 petroleum ether-ethermixture, and the first four liters of eluate is collected, and evaporated to dryness in vacuo to give a mixture of enol acetates containing 16α-methyl-17(20)-pregnene-3α,20-diol 3,20-diacetate. This mixture of enolates, weighing approximately 14 g., is dissolved in 50 ml. of benzene and treated with an excess of perbenzoic acid over a 16-hour period. The reaction mixture is shaken with dilute aqueous potassium hydroxide solution until the benzene layer is free of perbenzoic acid; the benzene layer is then washed with water until neutral, dried, and the solvent evaporated in vacuo to give a crystalline material, 16α-methyl-17α,20-epoxy-pregnane-3α,20-diol 3,20-diacetate. The latter material is dissolved, without purification, in 200 ml. of methanol, 120 ml. of water and 10 g. of potassium bicarbonate, and the resulting solution is heated at reflux under nitrogen for a period of 16 hours. The methanol is evaporated from the hydrolysis solution in vacuo, and the residual oil is extracted from the resulting aqueous solution with chloroform. The chloroform extract is washed with water to neutrality, dried, and the chloroform is evaporated under reduced pressure. The residual oil is triturated with ether, and the crystalline material thus formed is recrystallized from ethyl acetate-petroleum ether to give 16α-methyl-pregnane-3α,17α-diol-20-one.

To a solution of 7.0 g. of 16α-methyl-pregnane-3α,17α-diol-20-one in 50 ml. of chloroform is added dropwise with stirring a solution containing 3.36 g. of bromine in 24.2 ml. of chloroform over a period of about 60 minutes. The reaction mixture is dissolved in 200 ml. of ethyl acetate, and the resulting solution washed with water until neutral, dried, and the solvents evaporated therefrom in vacuo. The residual crude material is dissolved in a minimum quantity of ethyl acetate, the resulting solution is diluted with ether, and the mixture is stirred until crystals form. The crystalline product is recovered by filtration and washed, by slurrying, with 50:50 ether-petroleum ether mixture to give about 5 g. of 21-bromo-16α-methyl-pregnane-3α,17α-diol-20-one.

This 5 g. of 21-bromo-16α-methyl-pregnane-3α,17α-diol-20-one is mixed with 5.0 g. of anhydrous potassium acetate, 4.0 g. of sodium iodide and 0.03 ml. of glacial acetic acid, and 100 ml. of acetone is added to the resulting mixture. This mixture is then heated at reflux, with stirring, for a period of about 16 hours, and the reaction mixture is cooled, filtered, and the insoluble material is washed with acetone. The filtered solution is evaporated in vacuo thereby removing the solvents, and the residual material is slurried with water, and the aqueous mixture extracted with ethyl acetate. The ethyl acetate extract is washed with water to neutrality, dried, and the solvent is evaporated in vacuo to give an oil. This oil is crystallized from ether, and recrystallized from ethyl acetate-ether to give 16α-methyl-pregnane-3α,17α,21-triol-20-one 21-acetate.

A solution of 400 mg. of 16α-methyl-pregnane-3α,17α,21-triol-20-one 21-acetate in 4 ml. of pyridine is added to the complex formed by the addition of 400 mg. of chromium trioxide to 4 ml. of pyridine. The mixture is swirled until thoroughly mixed, and then allowed to stand at room temperature overnight. The reaction mixture is poured into water, and the aqueous mixture is extracted with ether, and then twice with ethyl acetate. The combined ether and ethyl acetate extracts are washed with dilute aqueous sulfuric acid at about 0° C., and then with water until neutral. The organic solvent layer is then dried, the solvents are evaporated therefrom in vacuo, and the residual crystalline material is purified by crystallization from ethyl acetate to give 16α-methyl-pregnane-17α,21-diol-3,20-dione 21-acetate.

To 100 mg. of 16α-methyl-pregnane-17α,21-diol-3,20-dione 21-acetate dissolved in 2 ml. of chloroform and 2.25 ml. of glacial acetic acid, at a temperature of −55° C., is added two drops of a 0.001 N solution of dry HBr in glacial acetic acid. To about 0.38 ml. of 0.001 N HBr in glacial acetic acid, at −55° C., is added 0.43 ml. of a solution containing 40 mg. of bromine in chloroform, and the resulting solution is added, over about a 10-minute period, to the solution of the steroid, while maintaining the reaction mixture at about −55° C. The reaction mixture is allowed to stand at −55° C. for about one half hour; a solution containing 250 mg. of sodium acetate in 3 ml. of water is added, and the resulting mixture is stirred for about 5 minutes. Five milliliters of water are then added, and the aqueous mixture is extracted with ethyl acetate. The ethyl acetate extract is washed with aqueous sodium bicarbonate solution to neutrality, then with water, dried, and the solvent is evaporated in vacuo. The residual material is dissolved in 2 ml. of acetone, and to the solution is added 25 mg. of sodium bromide and 1 ml. of water. The resulting mixture is heated under reflux for a period of about 5 hours, the reaction mixture is cooled, and the acetone is evaporated in vacuo. The residual material is extracted into ether, the ether extract is washed with water, dried, and the solvent is evaporated to a volume of about 1 ml.; petroleum ether is added to this solution, and the crystalline material which separates is recovered and dried to give approximately 90 mg. of 4-bromo-16α-methyl-pregnane-17α,21-diol-3,20-dione 21-acetate.

A mixture of 48 mg. of semicarbazide, 48 mg. of 4-bromo - 16α-methyl-pregnane-17α,21-diol-3,20-dione 21-acetate and 0.6 ml. of ethanol is heated under reflux in contact with a nitrogen atmosphere for a period of about three days, and the reaction solution is evaporated to a small volume, diluted with water and the crystalline material recovered and purified by recrystallization from aqueous methanol to give 16α-methyl-4-pregnene-17α,21-diol-3,20-dione-3,20-bis-semicarbazone 21-acetate. Fifty milligrams of 16α-methyl-4-pregnene-17α,21-diol-3, 20-dione-3,20-bis-semicarbazone 21-acetate is dissolved in a mixture of 1.0 cc. of benzene and 1.0 cc. of 1.1 N methanolic potassium hydroxide, and the solution is allowed to stand at room temperature for a period of about 10 minutes. The solution is then acidified with acetic acid, the benzene is evaporated in vacuo, and the residual material is recrystallized from ethyl acetate to give 16α - methyl - 4 - pregnene - 17α,21 - diol - 3,20 - dione-3,20-bis-semicarbazone.

A mixture of 60 mg. of 16α-methyl-pregnane-17α,21-diol-3,20-dione-3,20-bis-semicarbazone, 0.2 ml. of dimethylformamide, 0.6 ml. of chloroform, and 1.5 ml. of 1.0 N aqueous hydrochloric acid is heated under reflux for a period of about three hours. The resulting two-phase system is cooled to a temperature of approximately 15° C., and the layers are separated. The aqueous layer is extracted with chloroform, and the chloroform extracts are combined with the original chloroform-dimethylformamide solution. The combined organic layer is washed with an aqueous solution of sodium bicarbonate, and the chloroform and dimethylformamide in the combined organic layer is replaced with ethyl acetate by evaporation in vacuo. Petroleum ether is added and the resulting solution is subjected to a partition chromatogram using aqueous methanol as the stationary phase and benzene-chloroform as the moving phase to give 16α-methyl-4-pregnene-17α,21-diol-3,20-dione.

In a 500 ml. 3-neck flask equipped with condenser, dropping funnel and nitrogen inlet are placed 20 g. of potassium hydroxide in 90 ml. of water, 100 ml. of methanol and 100 ml. of ether. A solution of 10 g. of N-methyl-N-nitroso-tosylamide in 50 ml. of ether is placed in the dropping funnel.

Diazomethane is generated by warming the generation flask to 40–45° C. and cautiously adding the N-methyl-N-nitrosotosylamide-ether from the dropping funnel. Nitrogen is utilized to sweep the diazomethane into a solution of 20 g. of 3α-acetoxy-16-pregnene-20-one in 100 ml. of tetrahydrofuran and 120 ml. ether. The process is continued until the steroid solution remains yellow for several hours. The product, 3α-acetoxy-16α,17α-methyleneazo-pregnane-20-one largely precipitates from the reaction mixture. After 16 hours, the mixture is filtered, washed with ether and dried in air.

37.4 g. of 3α-acetoxy-16α,17α-methyleneazopregnane-20-one is placed in a 500 ml. round-bottom flask and heated by an oil bath in vacuo (pressure 0.6 mm.). A manometer and 12-liter surge flask are in the line between the reaction flask and pump trap. When the bath temperature reaches 180° C., the 3α-acetoxy-16α,17α-methyleneazo-pregnane-20-one begins to melt with evolution of nitrogen. After 10 minutes at 180–182° C. the melt is cooled, and is taken up in about 150 ml. of acetone, filtered through diatomaceous earth, and concentrated to about 100 ml. Ether is slowly added to the boiling solution until crystallization occurs, and the crystalline material is recovered and dried to give 3α-acetoxy-16-methyl-pregnene-20-one.

A solution of about 20.0 g. of 3α-acetoxy-16-methyl-16-pregnene-20-one, dissolved in 600 ml. of methanol, is cooled to 18° C., and 80 ml. of 30% hydrogen peroxide followed by 80 ml. of 2.5 N sodium hydroxide are added. Considerable material precipitates from solution, but all redissolves on stirring the reaction mixture at 25–30° C. for 40 minutes. The solution is kept at 15–20° C. for 18 hours, 600 ml. of saturated salt water is slowly added, and the crystalline precipitate which forms is filtered, washed with water, and dried to give 16α,17α-epoxy-3α-hydroxy-16β-methyl-pregnane-20-one.

To a solution of 2.69 g. of 16α,17α-epoxy-3α-hydroxy-16β-methyl-pregnane-20-one in 55 ml. dioxane is added 27 ml. of 2 M aqueous perchloric acid. The clear solution is kept at 25–30° C. for 65 hours, 175 ml. of cold water is added, and the slurry is chilled to 8° C. The material which precipitates is washed with water and dried to give a mixture of 3α,17α-dihydroxy-16-methyl-15-pregnene-20-one and 3α,17α-dihydroxy-16-methylene-pregnane-20-one.

A solution of 3.05 g. of the above described olefin mixture of 3α,17α-dihydroxy-16-methyl-15-pregnene-20-one and 3α,17α-dihydroxy-16-methylene-pregnane-20-one in 80 ml. of methanol is reduced in hydrogen at 1 atmosphere and 25° C. in the presence of 2.0 g. of 25% palladium-calcium carbonate catalyst. Modification of the hydrogenation conditions, pH, solvent, catalyst, etc. alters the isomer ratio significantly. Uptake of the calculated amount of hydrogen is complete in 45 minutes. The mixture is stirred an additional 30 minutes and filtered through diatomaceous earth. The colorless filtrate is evaporated to dryness, crystallized from ether, and the crystalline material recovered and dried to give a mixture of 3α,17α-dihydroxy-16α-methyl-pregnane-20-one and 3α,17α-dihydroxy-16β-methyl-pregnane-20-one. One gram of this hydrogenation product, containing 3α,17α-dihydroxy-16α-methyl-pregnane-20-one and 3α,17α-dihydroxy-16β-methyl-pregnane-20-one, is chromatographed on 100 g. of activated magnesium silicate. The 5% methanol-chloroform eluates give 3α,17α-dihydroxy-16β-methyl-pregnane-20-one.

A solution of 3.5 g. of 3α,17α-dihydroxy-16β-methyl-pregnane-20-one in 40 ml. of chloroform is warmed to 40–45° C. A solution of 1.7 g. of bromine in 25 ml. of chloroform is added dropwise to the stirred solution at a rate such that the color is not darker than pale yellow. The nearly colorless solution is cooled to 20° C. and 200 ml. of ether is added. The chloroform-ether solution is washed with excess cold 5% potassium bicarbonate solution, sodium bisulfite solution, and water, and dried over magnesium sulfate. The chloroform-ether solution is then evaporated to dryness to give 21-bromo-3α,17α-dihydroxy-16β-methyl-pregnane-20-one.

To 4.30 g. of 21-bromo-3α,17α-dihydroxy-16β-methyl-pregnane-20-one in 90 ml. of acetone and 0.10 ml. of acetic acid is added 4.83 g. of anhydrous potassium acetate and 3.85 g. of potassium iodide. The stirred mixture is refluxed for 18 hours and concentrated on the water pump to a small volume. Water is added, the product extracted into ethyl acetate, and the organic extract dried over magnesium sulfate to give about 4 grams of a colorless foam that partly crystallizes from acetone-ether to give 3α,17α,21-trihydroxy-16β-methyl-pregnane-20-one 21-acetate.

To a solution of 3α,17α,21-trihydroxy-16β-methyl-pregnane-20-one 21-acetate (4.0 g.) in 100 ml. t-butanol and 20 ml. of water cooled to 10–15° C., is added 3.5 g. N-bromo-succinimide. The suspension is stirred at 15° C. until all the N-bromosuccinimide has dissolved (90 minutes). The reaction mixture is kept at 2° C. for about sixteen hours and at 25° C. for 2 hours. Sodium sulfite solution is added to destroy bromine and the mixture concentrated on the water pump to a low volume. A granular precipitate forms; water is added, the precipitate filtered and washed with water; chromatography on neutral alumina and elution with mixtures of chloroform and benzene gives 17α,21-dihydroxy-16β-methyl-pregnane-3,20-dione 21-acetate.

To a stirred solution of 585 mg. of 17α,21-dihydroxy-16β-methyl-pregnane-3,20-dione 21-acetate in 10 ml. of acetic acid and 8 ml. of chloroform kept at −10° C. is added slowly 230 mg. of bromine in 6 ml. of chloroform. After addition is complete, 1.2 g. of sodium acetate in 7 ml. of cold water is added. Additional water is added and the mixture is extracted with chloroform. The chloroform extract is washed with dilute potassium bicarbonate, water and dried over sodium sulfate. The residue is triturated with ether to give 480 mg. of crystalline 4-bromo-17α,21-dihydroxy-16β-methyl-pregnane-3,20-dione 21-acetate.

To 583 mg. of 4-bromo-17α,21-dihydroxy-16β-methyl-pregnane-3,20-dione 21-acetate in 20 ml. of acetonitrile under nitrogen is added a slurry of 600 mg. of semicarbazide hydrochloride and 410 mg. sodium bicarbonate in 4 ml. of water. After 2 hours, the acetonitrile is removed in vacuo, water is added and about 540 mg. of crystalline 3-semicarbazone of 17α,21-dihydroxy-16β-methyl-4-pregnene-3,20-dione 21-acetate filtered, washed with water and dried.

540 mg. of the semicarbazone of 17α,21-dihydroxy-16β-methyl-4-pregnene-3,20-dione 21-acetate is dissolved in 20 ml. of acetic acid, 1.5 ml. of pyruvic acid and 5 ml. of water. After 18 hours at 25° C., water is added and the mixture extracted with chloroform. The chloroform extract is washed with aqueous potassium bicarbonate, water and dried over sodium sulfate. Removal of solvent gives crude 17α,21-dihydroxy - 16β - methyl-4-pregnene-3,20-dione 21-acetate which is purified by chromatography on neutral alumina and crystallization from acetone-ether. A solution of about 100 mg. of 17α,21-dihydroxy-16β-methyl-4-pregnene-3,20-dione 21 acetate in 3 ml. of methanol is treated with 0.1 g. of potassium bicarbonate in 1 ml. of water under nitrogen at reflux temperature for 7 minutes. The mixture is cooled, neutralized with 0.1 ml. of acetic acid in 1 ml. of water, the methanol is evaporated in vacuo, and the residual material is extracted with ethyl acetate. Evaporation of the ethyl acetate solution gives crystalline 17α,21-dihydroxy-16β-methyl-4-pregnene-3,20-dione.

Various changes and modifications may be made in carrying out the present invention without departing from the spirit and scope thereof. Insofar as these changes and modifications are within the purview of the annexed claims, they are to be considered as part of our invention.

We claim:

1. A compound having the following formula:

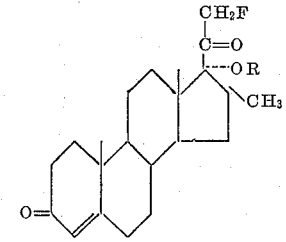

wherein R stands for lower hydrocarbon carboxylic acyl.

2. 16-methyl-21-fluoro - 17α - lower - alkanoyloxy - 4-pregnene-3,20-dione.

3. 16α-methyl-21-fluoro-17α-acetoxy-4-pregnene - 3,20-dione.

4. 16β - methyl-21-fluoro-17α-acetoxy-4-pregnene-3,20-dione.

5. 16α-methyl-21-fluoro - 17α - propionoxy-4-pregnene-3,20-dione.

6. 16β-methyl-21-fluoro - 17α - propionoxy-4-pregnene-3,20-dione.

References Cited in the file of this patent

Tannhauser et al.: 78, J.A.C.S., 2658–9 (1956).
Herz et al.: 78, J.A.C.S., 4813 (1956).
Huang-Minlon et al.: 74, J.A.C.S., 5394–95 (1952).